United States Patent
Eleftheriadis et al.

(10) Patent No.: US 12,519,506 B2
(45) Date of Patent: Jan. 6, 2026

(54) POWER SUPPLY UNITS AND BASEBAND PROCESSING UNITS FOR RADIO ACCESS NETWORK NODES

(71) Applicant: Telefonaktiebolaget LM Ericsson (publ), Stockholm (SE)

(72) Inventors: Lackis Eleftheriadis, Valbo (SE); Konstantinos Vandikas, Solna (SE); Athanasios Karapantelakis, Solna (SE); Ioannis Fikouras, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 396 days.

(21) Appl. No.: 18/015,335

(22) PCT Filed: Jul. 10, 2020

(86) PCT No.: PCT/EP2020/069627
§ 371 (c)(1),
(2) Date: Jan. 10, 2023

(87) PCT Pub. No.: WO2022/008083
PCT Pub. Date: Jan. 13, 2022

(65) Prior Publication Data
US 2023/0275616 A1  Aug. 31, 2023

(51) Int. Cl.
*H04B 3/54* (2006.01)
*H04W 88/08* (2009.01)
*H04W 92/20* (2009.01)

(52) U.S. Cl.
CPC .............. *H04B 3/54* (2013.01); *H04W 88/08* (2013.01); *H04W 92/20* (2013.01)

(58) Field of Classification Search
CPC ........ H04B 3/54; H04W 88/08; H04L 1/0026; H04L 1/0029
See application file for complete search history.

(56) References Cited

U.S. PATENT DOCUMENTS 7,269,403 B1 * 9/2007 Miao ................ H04B 3/542
455/17
7,656,904 B2 * 2/2010 Binder .............. H04M 15/8044
370/467

(Continued)

FOREIGN PATENT DOCUMENTS

| CN | 110739989 A | 1/2020 | |
| EP | 3324699 A1 * | 5/2018 | ............ H04W 88/04 |
| EP | 3500060 B1 * | 8/2021 | .......... H04W 88/085 |

OTHER PUBLICATIONS

International Search Report and Written Opinion of the International Searching Authority, PCT/EP2020/069627, mailed Mar. 23, 2021, 7 pages.

(Continued)

*Primary Examiner* — Hai V Nguyen
(74) *Attorney, Agent, or Firm* — Sage Patent Group

(57) ABSTRACT

According to an aspect, there is provided a power supply unit, PSU, configured for use in a first radio access network, RAN, node in a communication network. The PSU includes a power supply input interface configured to enable the PSU to be connected to, and receive electrical power from, an electrical power supply; and a power line communication, PLC, unit connected to the power supply input interface and configured to connect to a first baseband, BB, processing unit in the first RAN node. The first BB processing unit is configured for processing baseband signals in the first RAN node. The PLC unit is configured to operate according to a PLC protocol to enable communications between the first BB processing unit and a second BB processing unit in a second RAN node that is also connected to the electrical power supply.

19 Claims, 11 Drawing Sheets

(56) References Cited

U.S. PATENT DOCUMENTS

| | | | | |
|---|---|---|---|---|
| 7,684,823 B2 * | 3/2010 | Lauper | | H04W 92/12 |
| | | | | 455/554.1 |
| 8,081,950 B2 * | 12/2011 | Koga | | H04L 1/0003 |
| | | | | 375/257 |
| 8,406,239 B2 * | 3/2013 | Hurwitz | | H04L 49/30 |
| | | | | 340/568.2 |
| 8,660,042 B2 * | 2/2014 | Goldhamer | | H04B 3/542 |
| | | | | 370/467 |
| 8,830,039 B1 * | 9/2014 | Egan | | B60L 53/65 |
| | | | | 320/109 |
| 9,641,219 B2 * | 5/2017 | Pande | | H04L 27/2602 |
| 9,693,387 B2 * | 6/2017 | Tzou | | H04W 88/06 |
| 9,948,329 B2 * | 4/2018 | Saban | | H04B 7/0413 |
| 10,756,779 B1 * | 8/2020 | Jimenez De Parga Bernal | | |
| | | | | H04B 3/54 |
| 10,763,917 B1 * | 9/2020 | Jimenez De Parga Bernal | | |
| | | | | H04B 3/542 |
| 10,868,867 B2 * | 12/2020 | Binder | | G07C 3/02 |
| 11,637,612 B2 * | 4/2023 | Kinamon | | H04L 5/00 |
| | | | | 375/220 |
| 11,723,040 B2 * | 8/2023 | Sayenko | | H04L 5/001 |
| | | | | 455/450 |
| 11,870,532 B2 * | 1/2024 | Kinamon | | H04B 7/0697 |
| 2006/0142066 A1 * | 6/2006 | Lauper | | H04B 3/56 |
| | | | | 455/561 |
| 2012/0307917 A1 * | 12/2012 | Goldhamer | | H04B 3/542 |
| | | | | 375/257 |
| 2019/0166651 A1 * | 5/2019 | Ode | | H04W 88/08 |
| 2023/0006889 A1 * | 1/2023 | Thyagaturu | | H04L 41/5054 |
| 2023/0208536 A1 * | 6/2023 | Huo | | H04B 17/29 |
| | | | | 455/67.11 |

OTHER PUBLICATIONS

Huan, W., et al., "Mobile Data Offloading Under Attractor Selection in Heterogenous Networks," IEEE 2017 International Symposium on Wireless Communication Systems (ISWCS), Aug. 28, 2017, XP033255848, 8 pages.

* cited by examiner

POWER SUPPLY UNITS AND BASEBAND PROCESSING UNITS FOR RADIO ACCESS NETWORK NODES

CROSS REFERENCE TO RELATED APPLICATIONS

This application is a 35 U.S.C. § 371 national stage application of PCT International Application No. PCT/EP2020/069627 filed on Jul. 10, 2020, the disclosure and content of which is incorporated by reference herein in its entirety.

TECHNICAL FIELD

This disclosure relates to power supply units (PSUs) and baseband (BB) processing units for use in radio access network (RAN) nodes, and in particular to enabling communications between BB processing units.

BACKGROUND

In a $3^{rd}$ Generation Partnership Project (3GPP) cellular telecommunication network it can be the case that a so-called macrocell provided by a radio access network (RAN) node (such as a base station, an eNode B, eNB, a gNB, etc.) becomes overloaded with active users/wireless devices (also referred to as User Equipments, UEs) and it is desirable to handover some of the UEs to another cell, e.g. a small cell such as a nearby access point (AP) or a smaller range cell (e.g. a so-called picocell). One example of a suitable small range cell is provided by the Ericsson Radio Dot small cell device.

However, relying on handover to smaller cells has a few disadvantages. Firstly, there is significant capital expenditure (CAPEX) required for these small cells to be installed everywhere where they may be required. For indoor spaces these picocells can be a good solution because there can be a lot of demand in a constrained space, however for outdoor spaces many more of these picocells may need to be installed to provide sufficient coverage. Second, in case of mission-critical services (e.g. autonomous vehicles, remote surgery, unmanned aerial vehicle flight control, high-profile video conferencing, etc.), this offloading solution can have significant issues. For example, if the small cells use WiFi technology, then the spectrum is free and there are no guarantees about the quality of service (QoS), as other wireless devices may use the same spectrum. If, on the other hand, the macrocell is overloaded, then offloading to a small cell with 3GPP connectivity will still suffer from the same QoS problems, as the bandwidth (i.e. the spectrum range that the operator is licensed to use) is still the same as the macrocell.

SUMMARY

While the 3GPP specifications already provide some ways to handle overloaded macrocells as outlined above, there is a need for further options for handling overloaded cells, particularly where the overload in the cell is likely to be temporary.

The techniques described herein take advantage of the fact that many radio sites (where RAN nodes are located) are multi-vendor, meaning that multiple network operators/vendors use the radio site and each has its own antenna equipment installed on the radio tower(s) at that site. Network operators also share the same floor space in the cabinet(s) or cabinet room below the radio tower, with each network operator having its own rack/cabinet of switches, a fan control unit, baseband (BB) processing units, power regulators and AC/DC (alternating current/direct current) converters, etc. Typically, all cabinet equipment connects to the same AC power supply from the electrical power provider via respective or shared Power Supply Units (PSUs). Currently, there is some limited communication between the PSU and the baseband processing unit relating to energy management and fault management.

The techniques described herein provide that BB processing units at a radio site are able to communicate with each other using power line communication (PLC) technology implemented in PSUs at the radio site. This enables low-latency communications that can be efficiently established via existing PLC communication protocols and shared or common power supply wiring.

By enabling communications between hardware of the different network operators at a radio site and providing a suitable communication protocol, it is possible for one network operator whose cell is overloaded to effect a handover of one or more wireless devices to a less loaded cell of another network operator at the same radio site. While this handover could be achieved using conventional handover techniques (e.g. using signalling via the so-called X2 interface between eNBs and gNBs), this handover can be more efficiently effected by enabling the BB processing units of each network operator communicating with each other via PLC to arrange the handover, avoiding the need for the overhead and latency required for X2 communications (noting that although the X2 interface is between two eNBs/gNBs, the actual signalling path is through the core network of each eNB/gNB.

As well as (or instead of) arranging a handover, enabling the BB processing units to communicate with other can be used for other purposes, such as exchanging other types of BB control plane signalling, such as reference signals (e.g. reference signals (RS) in 4G, surrounding reference signals (SRS) in 5G, channel state information (CSI)-RS) and/or transmission power information (i.e. information on the transmission power used by a RAN node).

According to a first specific aspect, there is provided a power supply unit, PSU, configured for use in a first radio access network, RAN, node in a communication network. The PSU comprises a power supply input interface configured to enable the PSU to be connected to, and receive electrical power from, an electrical power supply; and a power line communication, PLC, unit connected to the power supply input interface and configured to connect to a first baseband, BB, processing unit in the first RAN node. The first BB processing unit is configured for processing baseband signals in the first RAN node. The PLC unit is configured to operate according to a PLC protocol to enable communications between the first BB processing unit and a second BB processing unit in a second RAN node that is also connected to the electrical power supply.

According to a second aspect, there is provided a first baseband, BB, processing unit, configured for processing baseband signals in a first radio access network, RAN, node in a communication network. The first BB processing unit is configured to connect to a power line communication, PLC, unit of a power supply unit, PSU, of the first RAN node. The PSU is configured to connect to an electrical power supply, and the PLC unit of the PSU is configured to operate according to a PLC protocol using the electrical power supply. The first BB processing unit is configured to communicate with a second BB processing unit in a second RAN node via the PSU.

According to a third aspect, there is provided a radio access network, RAN, node for use in a communication network. The RAN node comprises one or both of a PSU according to the first aspect or any embodiment thereof; and a first BB processing unit according to the second aspect or any embodiment thereof.

According to a fourth aspect, there is provided a method of operating a power supply unit, PSU, in a first radio access network, RAN, node in a communication network. The PSU comprises a power supply input interface connected to an electrical power supply, and a power line communication, PLC, unit connected to the power supply input interface. The method comprises enabling communications according to a PLC protocol using the electrical power supply between a first baseband, BB, processing unit in the first RAN node that is for processing baseband signals in the first RAN node and a second BB processing unit in a second RAN node that is also connected to the electrical power supply.

According to a fifth aspect, there is provided a method of operating a first baseband, BB, processing unit in a first radio access network, RAN, node in a communication network. The first BB processing unit is connected to a power line communication, PLC, unit of a power supply unit, PSU, of the first RAN node. The PSU is connected to an electrical power supply and the PLC unit of the PSU is configured to operate according to a PLC protocol using the electrical power supply. The method comprises communicating with a second BB processing unit in a second RAN node via the PLC unit of the PSU.

BRIEF DESCRIPTION OF THE DRAWINGS

Some of the embodiments contemplated herein will now be described more fully with reference to the accompanying drawings, in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 1:
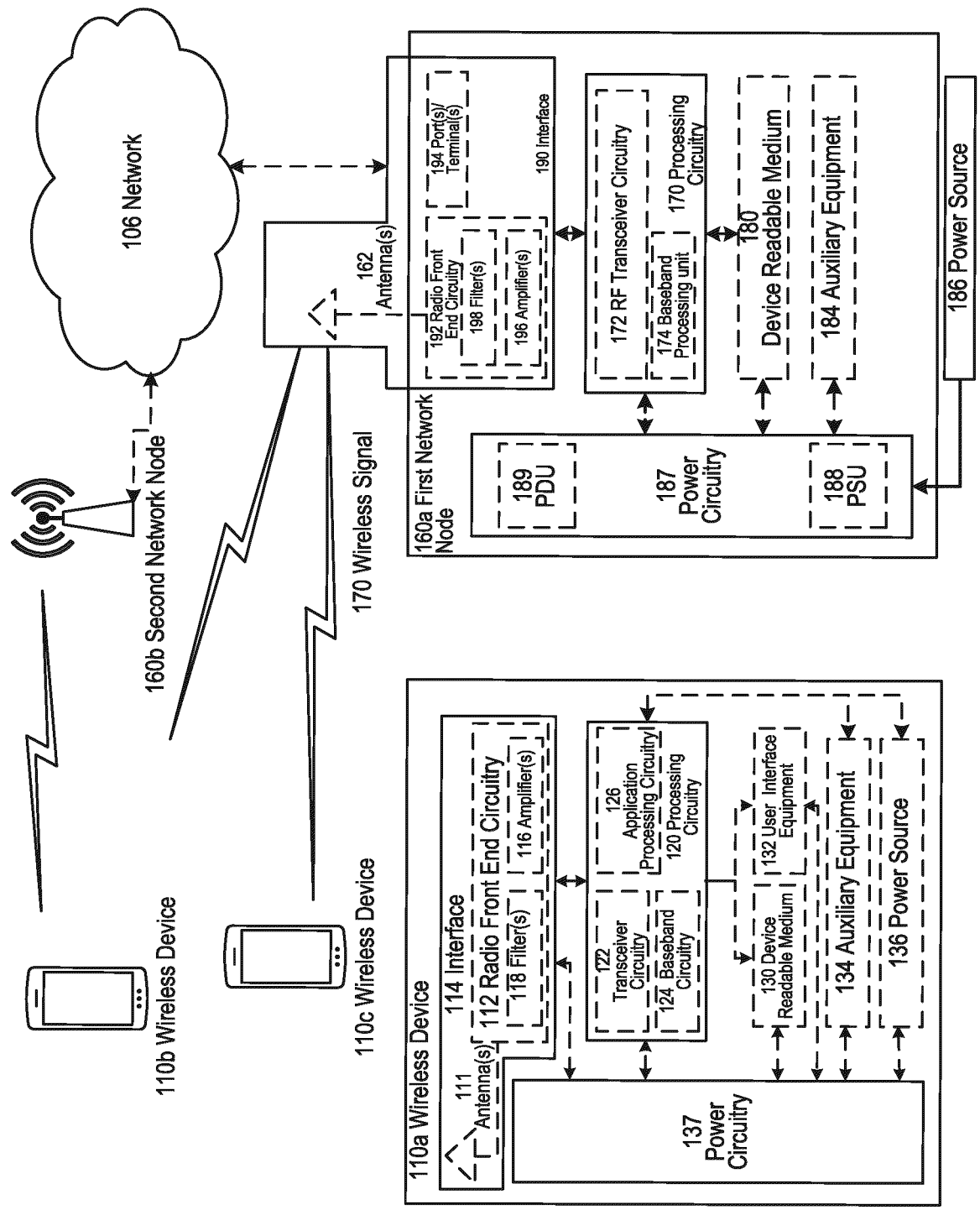
FIG. 1 is a block diagram of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, a first network node 160*a*, and WDs 110*a*, 110*b*, and 110*c*. In practice, a wireless network may further include any additional elements suitable to support communication between wireless devices or between a wireless device and another communication device, such as a landline telephone, a service provider, or any other network node or end device. Of the illustrated components, first network node 160*a* and wireless device (WD) 110*a* are depicted with additional detail. The wireless network may provide communication and other types of services to one or more wireless devices to facilitate the wireless devices' access to and/or use of the services provided by, or via, the wireless network. A second network node 160*b* is also shown in FIG. 1, and, for the purposes of this disclosure, the second network node 160*b* can be operated by the same or a different vendor/network operator to the vendor/network operator that operates the first network node 160*a* and the network 106. It will be appreciated that the terms "network operator" and "vendor" are used interchangeably herein. Also for the purposes of this disclosure, the first network node 160*a* and the second network node 160*b* are located at the same radio site, and are connected to the same electrical power supply, e.g. a 230/240 Volt AC power supply. Various components of the first network node 160*a* are shown in FIG. 1 and described in more detail below, and it will be appreciated that the second network node 160*b* can comprise similar components. Unless otherwise indicated, references below to "network node 160" can be understood as referring to both or either of the first network node 160*a* and the second network node 160*b* in FIG. 1. Likewise, unless otherwise indicated, references below to "wireless device 110" or "WD 110" can be understood as referring to any or all of the WDs 110*a*, 110*b* and 110*c*.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing unit 174. In some embodiments, radio frequency (RF) transceiver circuitry 172 and baseband processing unit 174 are on separate chips (or sets of chips), boards, or units, such as radio units and digital units. In alternative embodiments, part or all of RF transceiver circuitry 172 and baseband processing unit 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 can be an electrical power supply. Power circuitry 187 may be configured to provide power to the various components of network node 160 in a form suitable for the respective components (e.g., at a voltage and current level needed for each respective component). In particular the power circuitry 187 can comprise a power supply unit (PSU) 188 that is to connect to power source 186, and the PSU 188 outputs power at a suitable level and/or form (e.g. a suitable DC voltage) to a power distribution unit (PDU) 189 in the power circuitry 187. The PDU 189 distributes the power to the various components of the network node 160. Power source 186 is external to power circuitry 187 and network node 160. For example, network node 160 is connectable to an external power source (e.g., an AC electricity outlet) via an input circuitry or interface such as an electrical cable, whereby the external power source 186 supplies power to power circuitry 187. Although not shown in FIG. 1, the network node 160 may also comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D26D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 2:
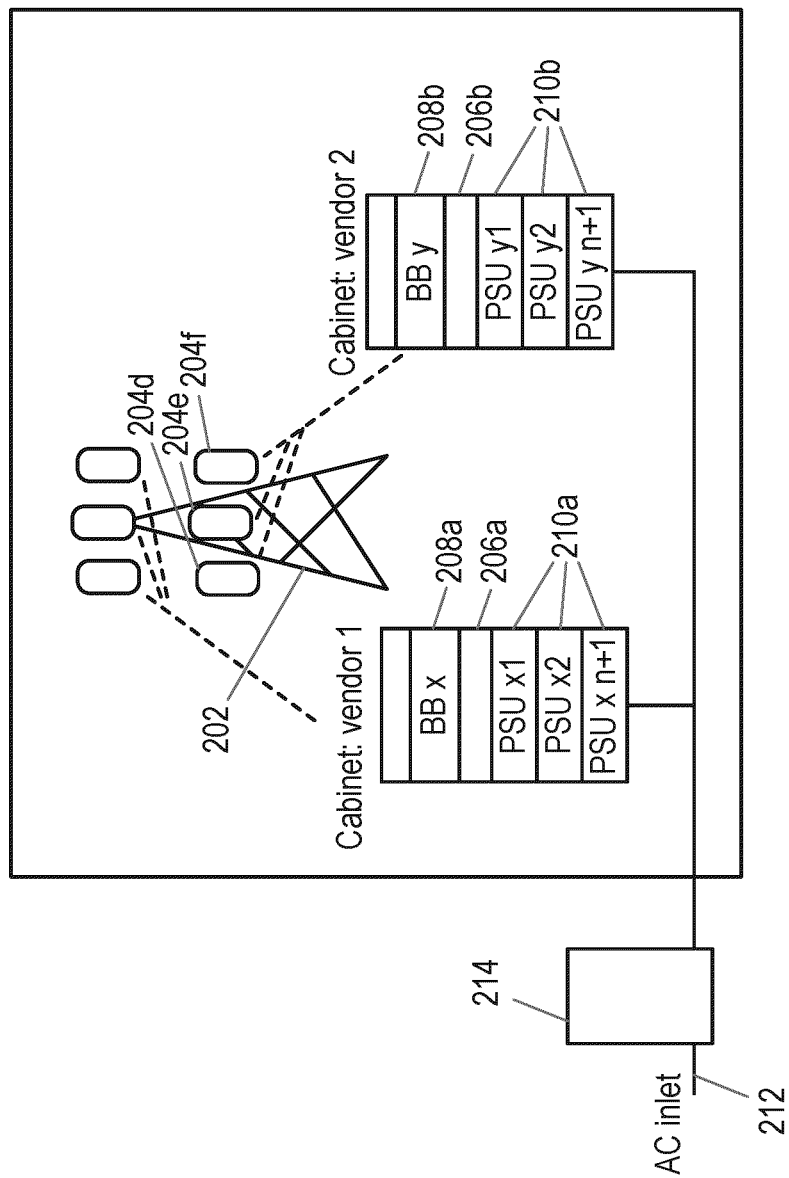
FIG. 2 is a schematic diagram of components of RAN nodes for different network operators located at the same radio site.

FIG. 2 is a schematic diagram of components of RAN nodes for different network operators located at the same radio site. The radio site is generally denoted 200 and includes one or more masts 202, on which one or more antennas 204 are mounted. Typically each network operator uses their own antennas 204, and in FIG. 2 a first group of antennas 204 (antennas 204*a*, 204*b* and 204*c*) are used by a first network operator, and a second group of antennas 204 (antennas 204*d*, 204*e* and 204*f*) are used by a second network operator. Each of the network operators has a respective cabinet 206*a*, 206*b* at the radio site 200 that comprises the components required for operating their respective RAN node. In FIG. 2 each cabinet 206 comprises a respective baseband (BB) processing unit 208*a/b* and one or more PSUs 210*a/b*. The BB processing unit 208*a/b* is connected to the respective group of antennas 204 and the respective PSU 210*a/b*. Each PSU 210*a/b* is connected to an external power supply 212, e.g. an AC electrical power supply, optionally via a utility cabinet 214 that is owned and managed by an electrical power supplier, and that includes, for example, an electricity meter for monitoring usage of the electrical power supply. Multiple PSUs 210 can be provided for redundancy purposes, and/or for providing power to separate components in the cabinet 206. It will be appreciated that FIG. 2 only shows the components required for explaining the techniques presented herein, and a typical cabinet/RAN node can include additional components to those shown in FIG. 2.

It should be noted that while the first network operator and the second network operator share the radio site 200 and the mast 202, the combination of the network operator's antennas 204 and components in the respective cabinet 206 are considered to be separate RAN nodes. That is, the first network operator is considered to operate a first RAN node using the components in cabinet 206a and antennas 204a-c, and the second network operator is considered to operate a second RAN node using the components in cabinet 206b and antennas 204d-f.

Figure 3:
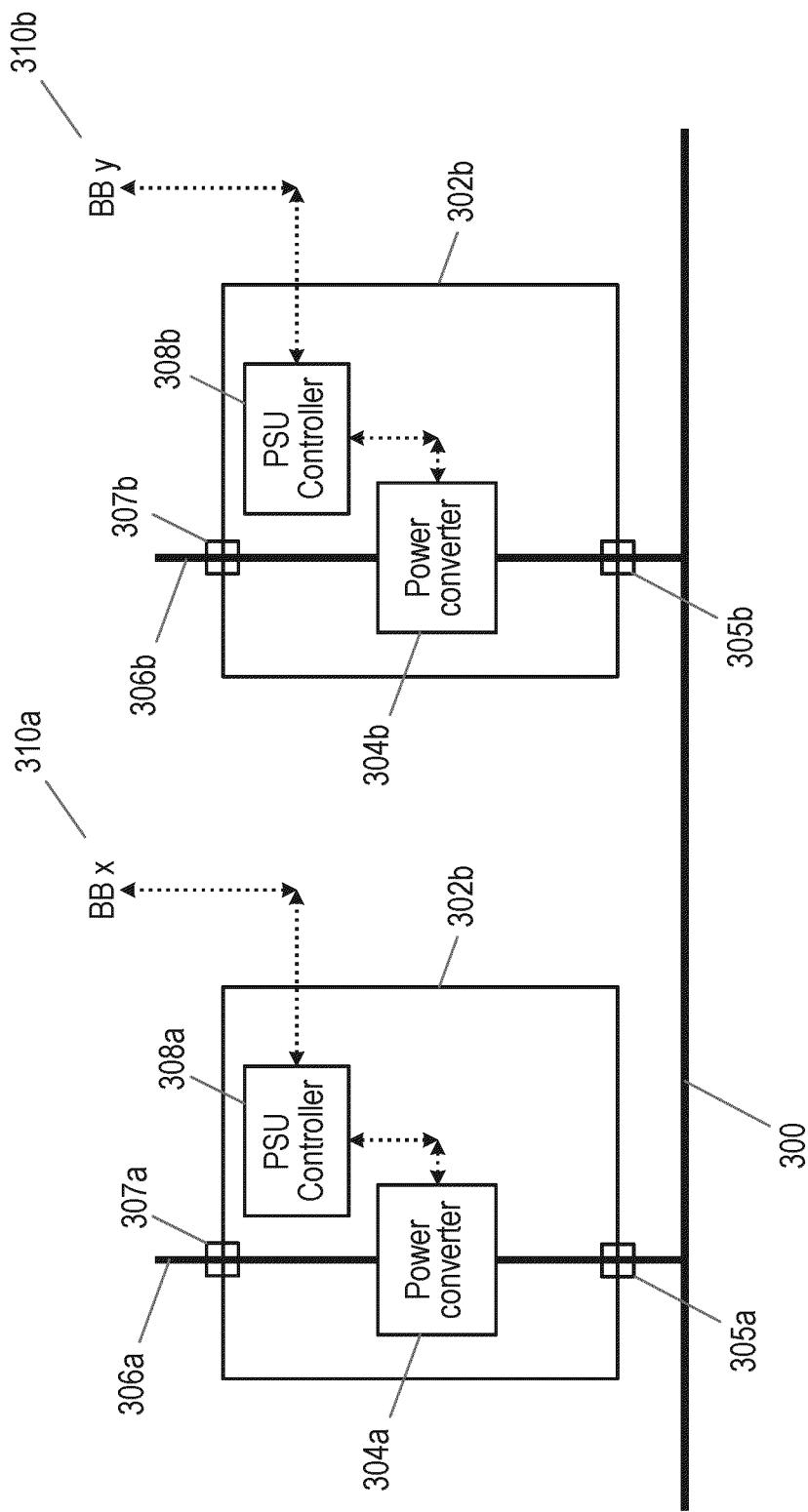
FIG. 3 is a block diagram showing two conventional PSUs connected to a common electrical power supply.

FIG. 3 is a block diagram showing two conventional PSUs connected to a common electrical power supply 300. Each PSU 302a/b is for the RAN node components of a respective network operator. Each PSU 302a/b includes a power converter 304a/b that is for converting the electrical power received from the power supply 300 via a respective power supply input interface 305a/b to an appropriate voltage and/or form for the other components of the RAN node. The converted electrical power is output via a respective output line 306a/b that is connected to a respective output interface 307a/b. For example the power converter 304a/b can convert input AC electrical power to DC electrical power that is supplied to the other components via output line 306a/b and the output interface 307a/b.

Each PSU 302a/b also includes a PSU controller 308a/b that controls the operation of the PSU 302a/b and that is connected to the BB processing unit 310a/b in the respective RAN node. The PSU controller 308a/b performs control and authentication operations between the PSU 302a/b and the BB processing unit 310a/b, for example enabling the BB processing unit 310a/b to authenticate the PSU 302a/b, control the power converter stage 304a/b, manage default operations of the PSU, and/or trigger alarms in the event a fault is detected.

As noted above, it has been recognised that enabling BB processing units at a radio site (particularly ones operated by different network operators) to communicate with each other outside of the typical inter-RAN node interfaces (e.g. X2) has several interesting use cases, such as handover, reference signals (e.g. RS, SRS, CSI-RS) and power exchange. To enable these communications, the techniques described herein propose the implementation of power line communication (PLC) technology in PSUs at the radio site and enabling the BB processing units to send baseband control plane signalling to other BB processing units at the radio site via the PSUs, PLC and the shared or common power supply wiring.

Figure 4:
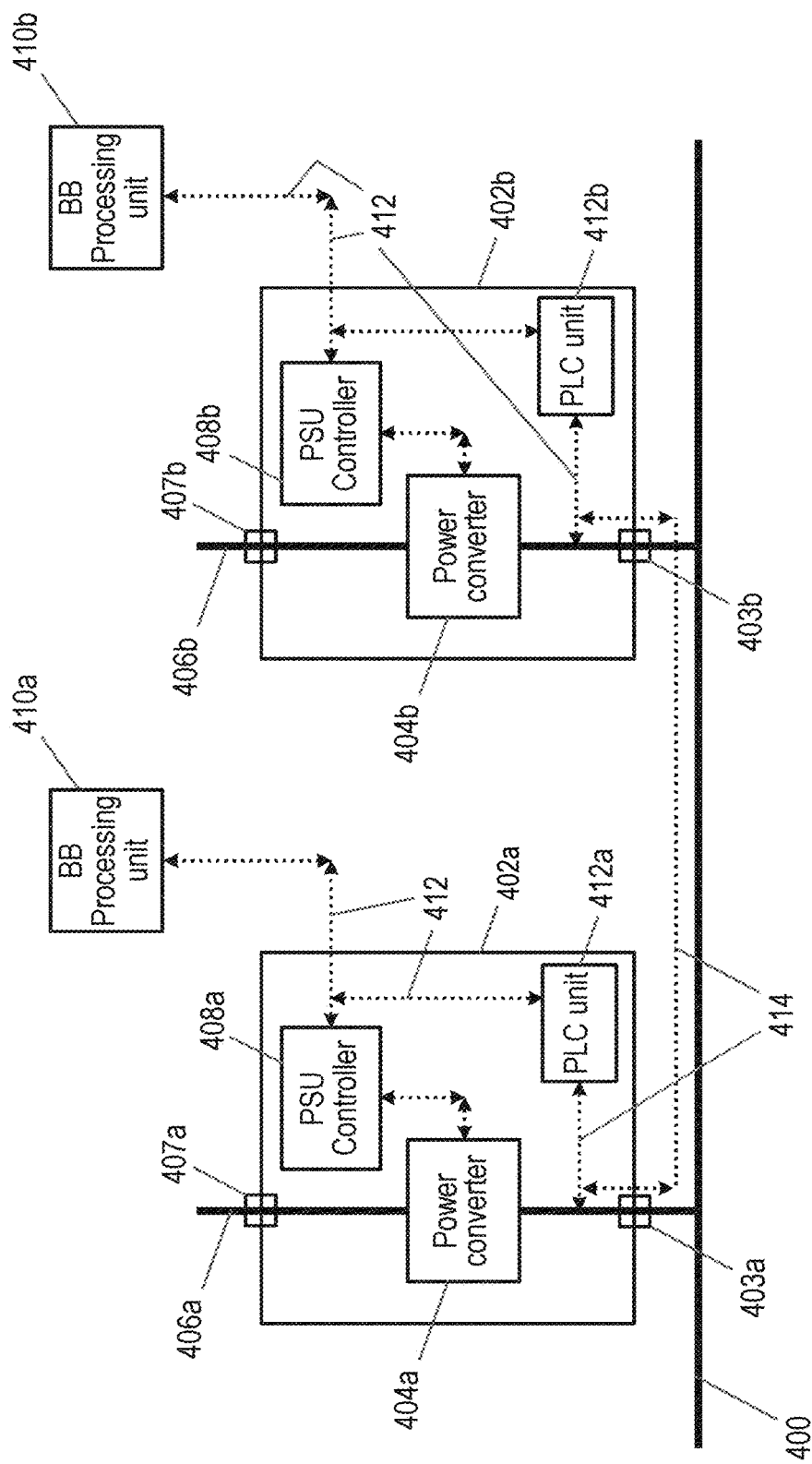
FIG. 4 is a block diagram showing two PSUs and BB processing units according to embodiments of the techniques described herein.

FIG. 4 is a block diagram showing two PSUs configured according to the techniques described herein connected to common electrical power supply wiring and respective BB processing units. Each PSU 402a/b is for providing power for the RAN node components of a respective network operator (e.g. including the BB processing unit, antenna(s), radio units, switches, fans, memory/storage units, etc.). Each PSU 402a/b has a respective power supply input interface 403a/b that is used to connect to, and receive electrical power from, the electrical power supply/power supply wiring 400. The PSU 402a/b may include a power converter 404a/b that is for converting the input electrical power received from the power supply 400 to an appropriate voltage and/or form for the other components of the RAN node. The converted electrical power is output via a respective output line 406a/b that is connected to a respective output interface 407a/b. For example the power converter stage 404a/b can convert input AC electrical power to DC electrical power that is supplied to the other components via output line 406a/b and the output interface 407a/b. In this case the power converter 404a/b is an AC-to-DC converter, e.g. a 230/240 Volts AC to 48 Volt DC converter. In some alternative embodiments, a power converter stage 404a/b is not required for the RAN node. In other alternative embodiments the power converter stage 404a/b is external to the PSU 402a/b.

Each PSU 402a/b can include a PSU controller 408a/b that controls the operation of the PSU 402a/b and that can be connected to the BB processing unit 410a/b in the respective RAN node. The PSU controller 408a/b performs control and authentication operations between the PSU 402a/b and the BB processing unit 410a/b, for example enabling the BB processing unit 410a/b to authenticate the PSU 402a/b, control the power converter stage 404a/b, manage default operations of the PSU, and/or trigger alarms in the event a fault is detected.

Each PSU 402a/b also includes a PLC unit 412a/b that connects to the electrical power supply 400 and the respective BB processing unit 410a/b, and that enables communication over the electrical power supply 400 using a PLC protocol. One well-known standard/protocol for PLC is "IEEE 1901-2010—IEEE Standard for Broadband over Power Line Networks". Those skilled in the art will be aware of other PLC protocols that can be used. In some embodiments, the PLC unit 412a/b can comprise a modulator component for modulating data to be communicated onto the electrical power supply 400, and a demodulator component for demodulating data modulated onto the electrical power supply 400 by another PLC unit 412a/b operating according to the PLC protocol. In this way, data can be exchanged between the two BB processing units 410a/b as shown by dotted lines 414. The PLC unit 412a/b connects to the electrical power supply 400 via the power supply input interface 403a/b.

The BB processing unit 410a/b is generally conventional, and is configured for processing baseband signals for the relevant RAN node. For example, the BB processing unit 410a/b can be configured to for any of: switching, traffic management, timing, baseband signal processing, radio interfacing, configuration, operation and maintenance of the radio site. In addition, the BB processing unit 410a/b is configured to connect to the PLC unit 412a/b of the PSU 402a/b, and also configured to send information to, and/or receive information from, another BB processing unit 410a/b in another RAN node via the PLC unit 412a/b. In some embodiments, the BB processing unit 410a/b is configured to connect to the PLC unit 412a/b of the PSU 402a/b and communicate information using the Ethernet protocol.

In certain embodiments the PSUs 402a/b are to be used to communicate/exchange control plane information between BB processing units 410a/b rather than using existing secure interfaces, such as X2. As this information will be effectively leaving the security of the BB processing unit 410a/b when it is communicated using PLC over the common electrical power supply wiring 400 (and which may also be being used by other network operators at the same radio site who should not be able to read the information being exchanged), the PLC unit 412a/b can be configured to communicate the information (e.g. control plane information) securely via the common power supply 400. In some embodiments, a PLC unit 412*a/b* can be configured to establish a secure communication link with another PLC unit 412*a/b* that has a similar or the same security level as communications between BB processing units 410*a/b* on the X2 interface. Thus, the PLC units 412*a/b* can be configured to perform authentication procedures to verify the identity of other PLC units 412*a/b*, and to encrypt communications sent via the power supply 400. In one approach, symmetric encryption techniques can be used, whereby a key is mutually held by both PSUs 402*a/b* and used to encrypt and decrypt information. The key could be provided by a trusted key exchange in the form of a certificate and may be hardcoded in the PSUs 402*a/b*.

In some embodiments, to facilitate the communications between the BB processing units 410*a/b*, the PLC unit 412*a/b* can implement a protocol stack for communications, comprising protocols typically used for communicating information in telecommunication networks. For example, the PLC unit 412*a/b* can implement a protocol stack as follows:

Physical Network: PLC
Data Link Layer: Ethernet, Asynchronous Transfer Mode (ATM), etc.
Internet Layer: Internet Protocol (IP)
Transport Layer: User Datagram Protocol (UDP), Transmission Control Protocol (TCP), etc.
Application Layer (which is optional): Hypertext Transfer Protocol (HTTP), Real-time Transport Protocol (RTP)/ RTP Control Protocol (RTCP), Simple Mail Transfer Protocol (SMTP), File Transfer Protocol (FTP), etc.

As noted above, by enabling communications between hardware of the different network operators at a radio site, it is possible for one network operator whose cell is overloaded to effect a handover of one or more wireless devices to a cell of another network operator at the same radio site that is less loaded. It should be appreciated that the handover described herein is not intended to replace normal roaming procedures or normal handover techniques via signalling using the X2 interface, but typically this handover could be used where the overload in the source cell is expected to be temporary and of short duration, since the handover can be performed with less latency and less X2 signalling overhead than a normal handover.

Figure 5:
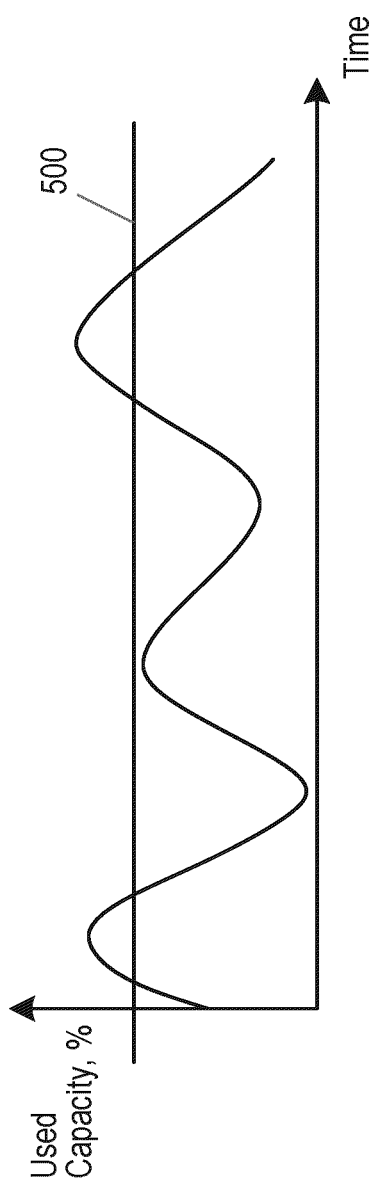
FIG. 5 is a graph illustrating how the used capacity of a cell can vary over time.

In some embodiments, the handover process described herein can be initiated by a BB processing unit when the used capacity/current load of its cell/cells exceeds a certain threshold. FIG. 5 is a simple graph illustrating how the used capacity/load of a cell can vary over time, and an exemplary threshold 500 at which the BB processing unit can request a handover of one or more wireless devices to another cell operating at the same radio site. In some embodiments, the used capacity/load threshold can be set to 80%, and in other embodiments the used capacity/load threshold can be set to 90%. Those skilled in the art will appreciate that other suitable threshold values can be used.

Figure 6:
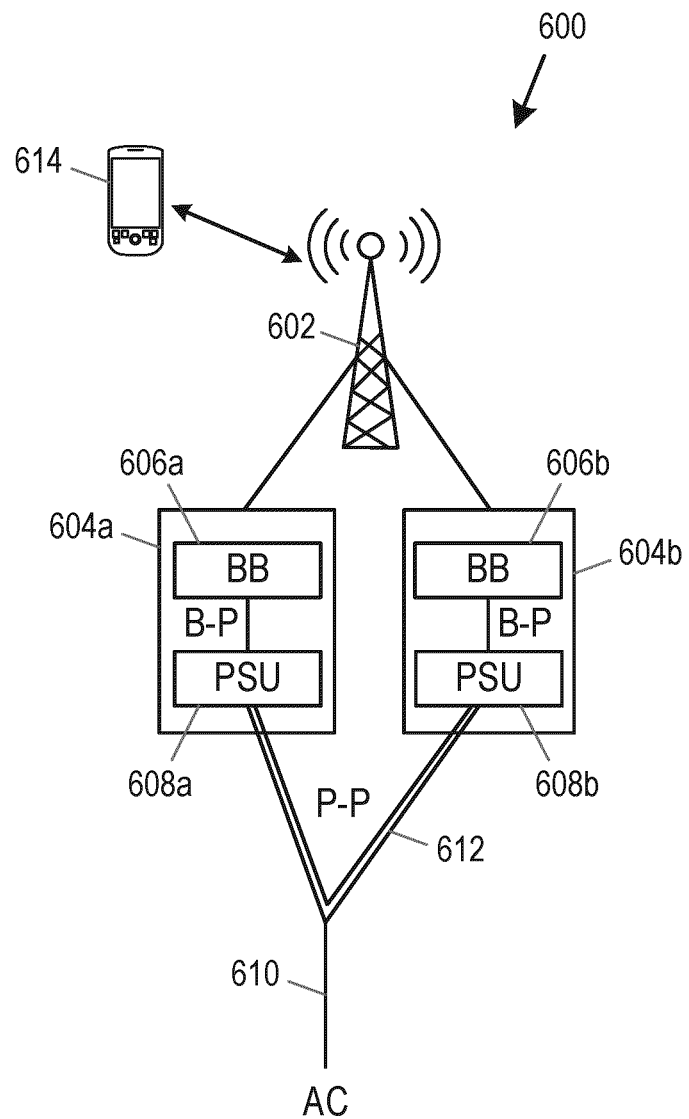
FIG. 6 is a diagram illustrating the communication paths used to effect a handover using PLC.

FIG. 6 is a simplified diagram illustrating the communication paths used to effect the handover described herein. FIG. 6 shows a radio site 600 that has a mast 602 with attached antennas for different network operators. The radio site 600 includes RAN node components 604*a* for a first network operator and RAN node components 604*b* for a second network operator. Each network operator provides and controls one or more cells from the radio site 600. The RAN node components 604*a* for the first network operator include BB processing unit 606*a* and PSU 608*a* that are configured as described above with reference to FIG. 4. The RAN node components 604*b* for the second network operator include BB processing unit 606*b* and PSU 608*b* that are configured as described above with reference to FIG. 4. The PSUs 608*a* and 608*b* are connected to a common electrical power supply 610, and the PLC units in the PSUs enable communications between the RAN node components 604*a* and 604*b*, as shown by the line labelled 612. A first wireless device 614 is also shown in FIG. 6 that is initially served by a cell provided by the first network operator (i.e. a cell provided by BB processing unit 606*a*). In the following discussion, the interface between the BB processing unit 606*a/b* and the PSU 608*a/b* in the same RAN node is denoted B-P, and the interface between the PSUs 608*a/b* in the two RAN nodes is denoted P-P. In some embodiments, the B-P interface is provided by Ethernet. In conventional RAN nodes the B-P interface between a BB processing unit and a PSU is also Ethernet, although it is only used for relaying information about power load. In some embodiments, the P-P interface is provided by Ethernet (e.g. Powerline Ethernet or Ethernet over PLC), or the Asynchronous Transfer Mode (ATM) protocol.

Figure 7A:
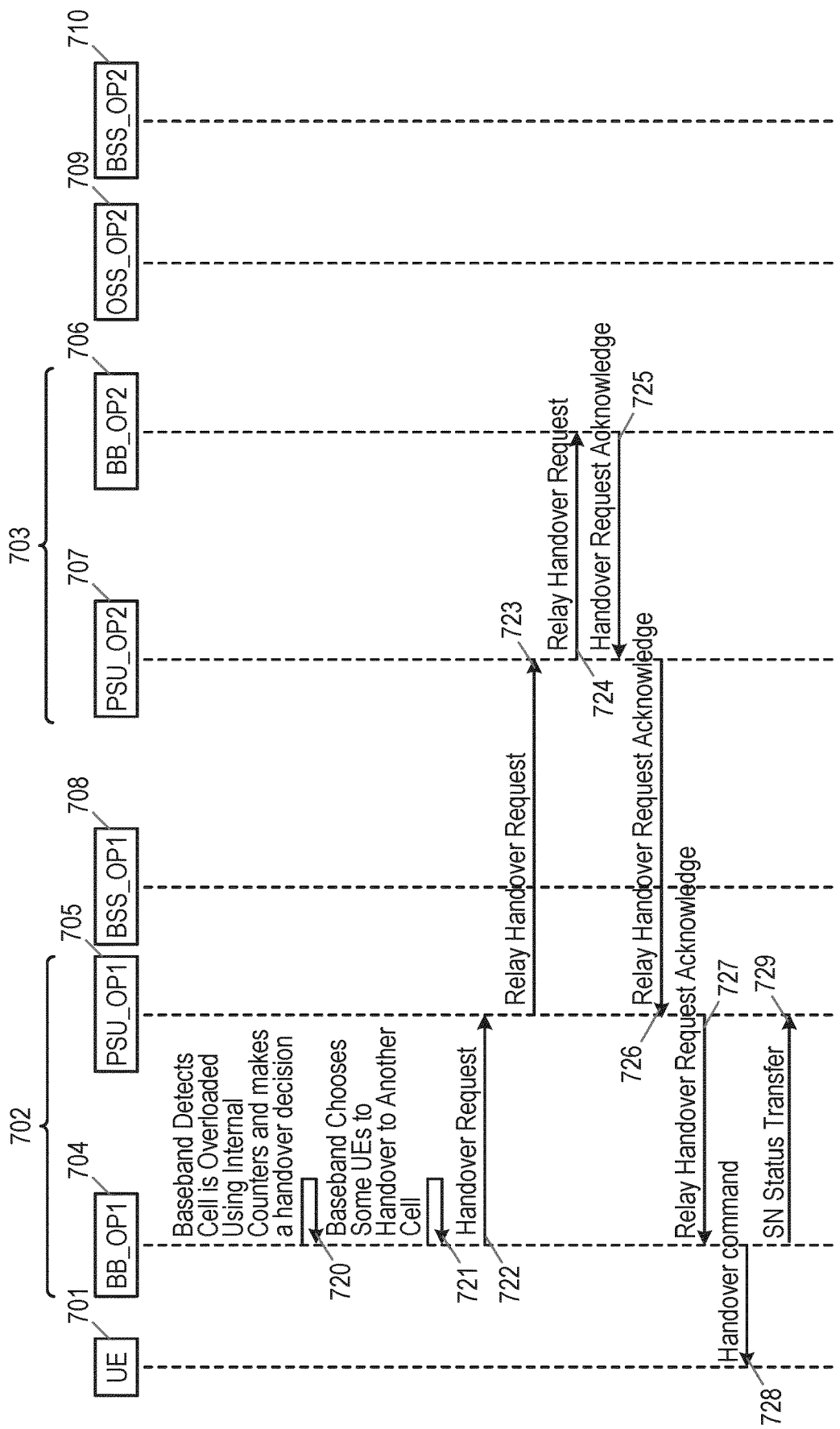
FIG. 7 is a signalling diagram illustrating a handover procedure using PLC communications between two BB processing units at a radio site.
Figure 7B:
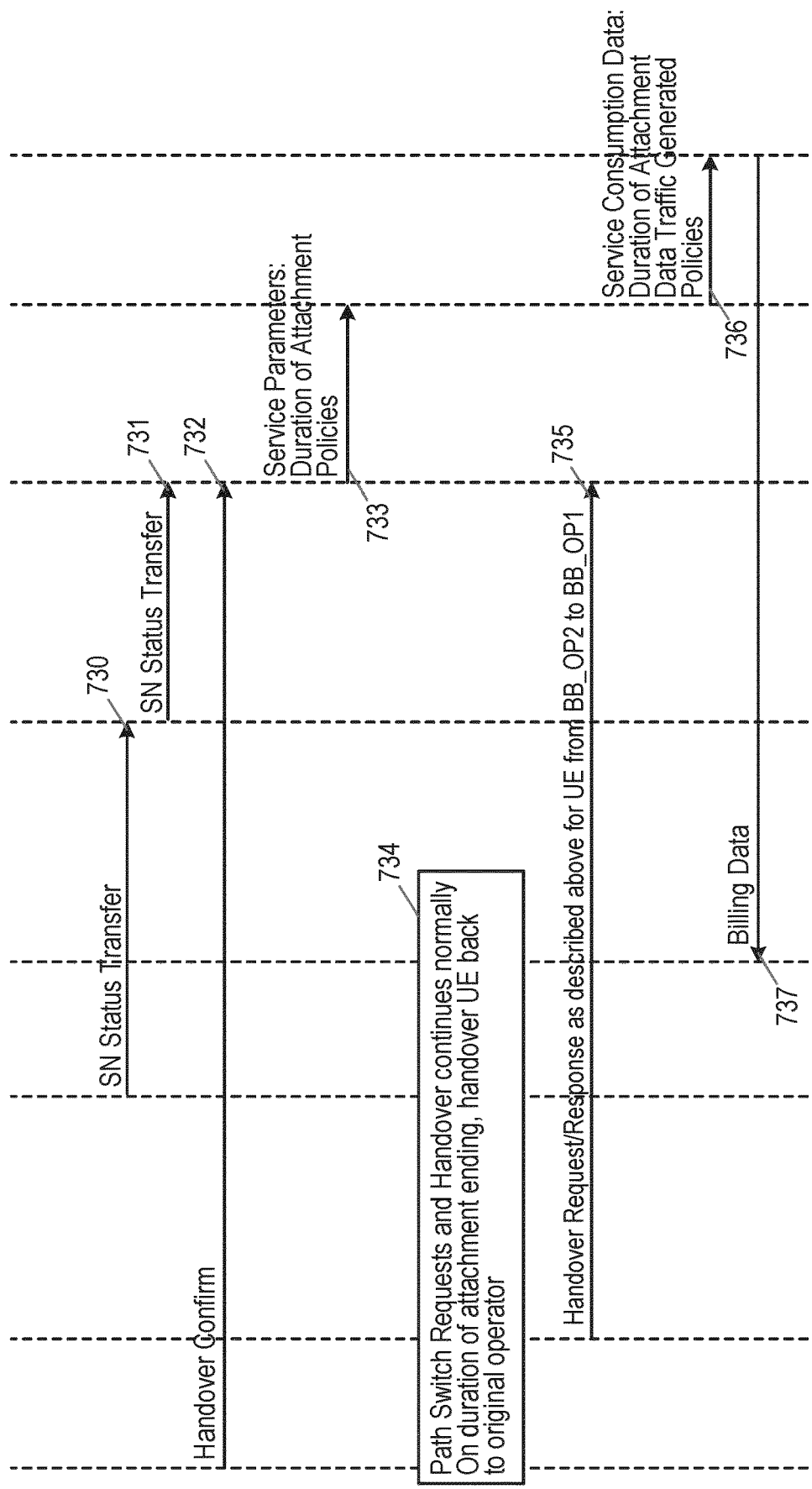

FIG. 7 is a signalling diagram illustrating a handover procedure using PLC communications between two BB processing units at a radio site due to overload in the cell managed by one of the BB processing units. In particular, FIG. 7 relates to a handover of a wireless device (UE) 701 from a first RAN node 702 that is operated by a first network operator to a second RAN node 703 that is operated by a second network operator. The first RAN node 702 includes a first BB processing unit 704 (BB_OP1) and a first PSU 705 (PSU_OP1) that are configured as described above with reference to FIG. 4. The second RAN node 703 includes a second BB processing unit 706 (BB_OP2) and a second PSU 707 (PSU_OP2) that are configured as described above with reference to FIG. 4. Also shown is a first Business Support System (BSS) node 708 (BSS_OP1) that is part of the core network of the first network operator, and an Operating and Support System (OSS) node 709 (OSS_OP2) and a second BSS node 710 (BSS_OP2) that are both part of the core network of the second network operator.

Generally, the handover procedure illustrated in FIG. 7 corresponds to the conventional handover procedure set out in "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)"; 3GPP TS 36.300 V16.1.0 (2020-03), except that the communications between the BB processing units 704, 706 are transmitted via the PSUs 705, 707 using PLC. Hereafter, the above specification is referred to simply as "3GPP TS 36.300 V16.1.0".

Initially, the UE 701 is connected to and being served by a first cell (also known as the 'source cell' for the purposes of handover) provided by the first BB processing unit 704. In step 720, the first BB processing unit 704 detects that a handover of UE 701 to a second cell provided by another RAN node at the same radio site is desired (the second cell is also known as the 'target cell' for the purposes of handover). For example, the first BB processing unit 704 can detect that the load (e.g. the amount of data traffic) on the cell is at least a certain amount (e.g. 80%, 90%, etc.) of the available capacity of the first cell, and this is referred to as a 'cell overload event'. The first BB processing unit 704 can monitor the cell load using internal counters that are accessible to the first BB processing unit 704. In one example, the total throughput generated by all active UEs in the cell may reach or exceed the capacity of the cell, or reach or exceed the capacity for a period of time (noting that network operators may allow cells to run over-capacity for some time). As an alternative to (or in addition to) determining cell load from the amount of data traffic, the load of the cell may be determined as the number of active and/or idle UEs in the cell, with a cell overload event being determined if the number of active and/or idle UEs in the cell is more than a threshold.

Having determined or decided that a handover of some UEs to a second cell of another RAN node is required, in step 721 the first BB processing unit 704 selects which UE or UEs should temporarily handover to the second cell. The choice of which UEs may be done using any suitable criteria. Suitable criteria may include any one or a combination of the following:

- activity in terms of throughput: the most active UEs (i.e. those generating the highest throughput) can more likely be chosen for handover.
- history of handovers: the UEs that are more likely to stay in the area of coverage of the first cell (the ones not highly mobile) are more preferable to be chosen for handover.
- one or more policies, for example whether a UE has one or more Evolved Packet System (EPS) sessions characterised by a specific Quality of Service (QoS) Class Identifier (QCI). If QCI is best-effort for all UE sessions (number 9), the UE is more likely to be chosen for handover. However if for at least one of the UE sessions the QCI is, e.g. 1-3, then this UE performs mission-critical tasks, and therefore will not be chosen for handover. This latter case can include a UE that has one or more established data sessions towards the Internet and/or with another UE, and that this UE is part of a mission-critical communications service. Some examples of mission-critical tasks can relate to autonomous vehicles (e.g. if the vehicle is being monitored remotely by an engineer), remote surgery (e.g. a robotic arm UE is being controlled remotely by a doctor), unmanned aerial vehicle flight control, high-profile video conferencing, etc. (see examples in comments above).

The first BB processing unit 704, having chosen a suitable UE for handover based on the aforementioned criteria (in this case the first UE 701), initiates a handover request to the second BB processing unit 706, which, instead of using the typical communication route for inter-RAN node handovers (i.e. X2) is relayed to the second BB processing unit 706 of the second network operator's cell using PLC. Thus, the first BB processing unit 704 sends a handover request (signal 722) to the first PSU 705. The handover request 722 can be as described in section 20.2.2.1 of 3GPP TS 36.300 V16.1.0.

When compared to a conventional X2-based handover process, the content/payload of the handover request 722 can differ from an X2-based handover request message as the handover request is exchanged between two BB processing units belonging to two different network operators. Therefore, the handover request 722 can include an IP address of the serving gateway (SGW) of the first network operator so that a new bearer can be established. It should be noted that it is assumed that the serving gateway has a public IP address, but as in many cases a SGW is collocated with a paging gateway (PGW), this is most likely the case. The additional information will lead the second network operator to initiate an S1 bearer establishment process across it's backhaul and core network to the address of the SGW of the first network operator.

The first PSU 705 relays the handover request to the second PSU 707 of the second RAN node 703 using PLC (shown as signal 723), and the second PSU 707 sends the handover request on to the second BB processing unit 706, as shown by signal 724.

The second BB processing unit 706 determines that a handover to the second cell is possible, and responds to the handover request by sending a handover request acknowledgement (signal 725) to the first BB processing unit 704. The handover request acknowledgement 725 can be as described in section 20.2.2.1 of 3GPP TS 36.300 V16.1.0. This handover request acknowledgement is sent to the second PSU 707 (shown as signal 725), which relays the acknowledgement to the first PSU 705 via PLC (signal 726). The first PSU 705 forwards the acknowledgement to the first BB processing unit 704 (signal 727).

After receiving the handover acknowledgement, the first BB processing unit 704 sends a handover command message 728 to the first UE 701 to inform the first UE 701 that a handover to the second cell will be performed. Although not shown in FIG. 7, the UE 701 subsequently makes a preamble attempt to connect to the second RAN node 703. The UE 701 continues to attempt this until it attaches to the second RAN node 703.

Then the first BB processing unit 704 sends a status message to the second BB processing unit 706 to provide the second BB processing unit 706 with the information required for a successful handover of the first UE 701 to the target cell. This status message can be a "SN [Sequence Number] Status Transfer" message that is defined for a X2 handover and that is used to transfer an uplink Packet Data Convergence Protocol (PDCP) SN and Hyper Frame Number (HFN) receiver status and the downlink PDCP SN and HFN transmitter status for the first UE 701 from the first RAN node 702 to the second RAN node 703. In particular, the "SN Status Transfer" message can be as defined in section 20.2.2.4 of 3GPP TS 36.300 V16.1.0. As with the handover request 722, the first BB processing unit 704 sends the status message to the first PSU 705 (signal 729), the first PSU 705 relays the status message to the second PSU 707 of the second RAN node 703 using PLC (shown as signal 730), and the second PSU 707 sends the status message on to the second BB processing unit 706, as shown by signal 731.

Having completed the handover to the second RAN node 703 (i.e. the first UE 701 is now communicating with the second RAN node 703), the first UE 701 then sends a handover confirm message 732 to the second BB processing unit 706. Although not shown in FIG. 7, the second BB processing unit 706 notifies a mobility management node in the core network (e.g. a Mobility Management Entity (MME) in 4G or an Access and Mobility Management Function (AMF) in 5G. The handover confirm message 732 can be as described in section 19.2.2.5.3 of 3GPP TS 36.300 V16.1.0.

Next, the second BB processing unit 706 sends information 733 about service parameters to the OSS node 709 in the second network operator's core network. This information 733 is sent to the OSS node 709 using the normal backhaul connections for the second RAN node 703. The service parameter information 733 can include information indicating the duration of the attachment of the first UE 701 to the second cell. In particular, as the handover may have been triggered due to overload in the first cell that is expected to be of short duration, the handover may be set to last for up to a maximum amount of time before the first UE 701 is handed back to the first cell. This time-limited handover is useful since a handover of this type causes the first UE 701 to roam to the network of the second network operator, and this may result in roaming charges that will need to be borne by either the first network operator, or passed on to the subscriber that owns the first UE 701. The duration of the time-limited handover may be predetermined, for example by agreement between the first network operator and the second network operator.

The service parameter information 733 can also or alternatively include information indicating any policies applied to the first UE 701, such as those relating to QoS, Guaranteed Bit Rate (GBR), latency ceiling, etc.

As noted by step 734, the handover process continues in the normal way (e.g. as described in 3GPP TS 36.300 V16.1.0), with path switch requests being sent to handover the first UE 701 to the second cell, and the first UE 701 is now served by the second RAN node 703.

Also as noted in step 734, if the specified duration of the handover to the second cell expires, the first UE 701 can be handed back to the first cell by the second RAN node 703. This handover, as shown by step 735, can follow the same process outlined above with respect to steps/signals 722-734, with the roles of the first BB processing unit 704 and the second BB processing unit 706 reversed.

While the first UE 701 is connected to the second cell, or alternatively after the first UE 701 has been handed back to the first cell, the OSS 709 can send information 736 about the first UE's attachment to the second cell to the second BSS 710. This information 736 can comprise service consumption data, such as the duration of attachment of the first UE 701 to the second cell, the amount of data traffic generated, the policies used, etc.

The second BSS 710 can then send billing information 737 to the first BSS 708 in the first network operator's network. The billing information can indicate the charge or cost of the roaming of the first UE 701 to the second network operator's network. this billing information 737 can be sent using the normal communication links between different core networks.

Thus, as outlined above, the signalling relating to the establishment of the handover is performed via PLC between the BB processing units and PSUs of each of the RAN nodes.

It will be appreciated that, depending on the quality of the electrical power supply, the rate at which data can be transferred using PLC can vary. For example other electrical devices that may be connected to the same grid/power supply could cause interference. Therefore, in some embodiments, a reliability check of the PLC link between the PSUs can be performed to determine if it is possible to use PLC to communicate between the BB processing units. As an example, this check can be performed using the Internet Control Message Protocol (ICMP). For example, a reliability check can use TCP-based communications to send a test message over the PLC link. Depending on the amount of packet drops and/or amount of re-transmissions that occur during this test, the PLC link can be deemed as reliable or unreliable. For example, an observed number of packet drops and/or amount of retransmissions can be compared to a (respective) reliability threshold, and if the number of packet drops and/or amount of retransmissions is above the (respective) reliability threshold, then the PLC link can be considered to be unreliable.

The Bit Error Rate (BER) of a signal over the PLC link can be an indicator of the reliability of the power supply, and whether the power supply is subjected to large interference or disturbance. On a stable power supply, the BER is very low, close to zero.

If the PLC link becomes unreliable (e.g. the bit error rate value increases above a reliability threshold), it may still be acceptable to utilise the PLC link for non-mission critical transmissions such as the availability of the RAN node, in case a discovery request over PLC is transmitted, or for periodic diagnostic signals. Thus, a high value of bit error rate may be accepted, depended on use case and criticality of the messages/request.

Large interference or disturbances in the quality of a PLC link can be caused by other electrical devices connected to the power supply. Thus, in some embodiments, when the Bit Error Rate value (or other indicator of signal reliability) indicates high interference and/or low reliability, one or more of the PSUs connected to the power supply can be switched off for a short period while the signals are sent between the BB processing units via PLC and then switched back on again once the signal(s) have been sent. In particular, a transmitting PSU can be briefly switched off once it has transmitted the PLC data packets towards the other BB processing unit so that there is less interference for a receiving PSU in receiving those data packets. Switching one or more PSUs off can help to avoid back feed transients from a PSU to the electrical power supply/AC grid, enabling higher quality/reliability PLC communications to take place. As an example, a PSU can be switched off for 1 millisecond while a PLC communication is to take place and then switched back on. This switching off and on can be repeated whenever signals are to be sent between the BB processing units and/or PSUs via PLC.

Figure 8A:
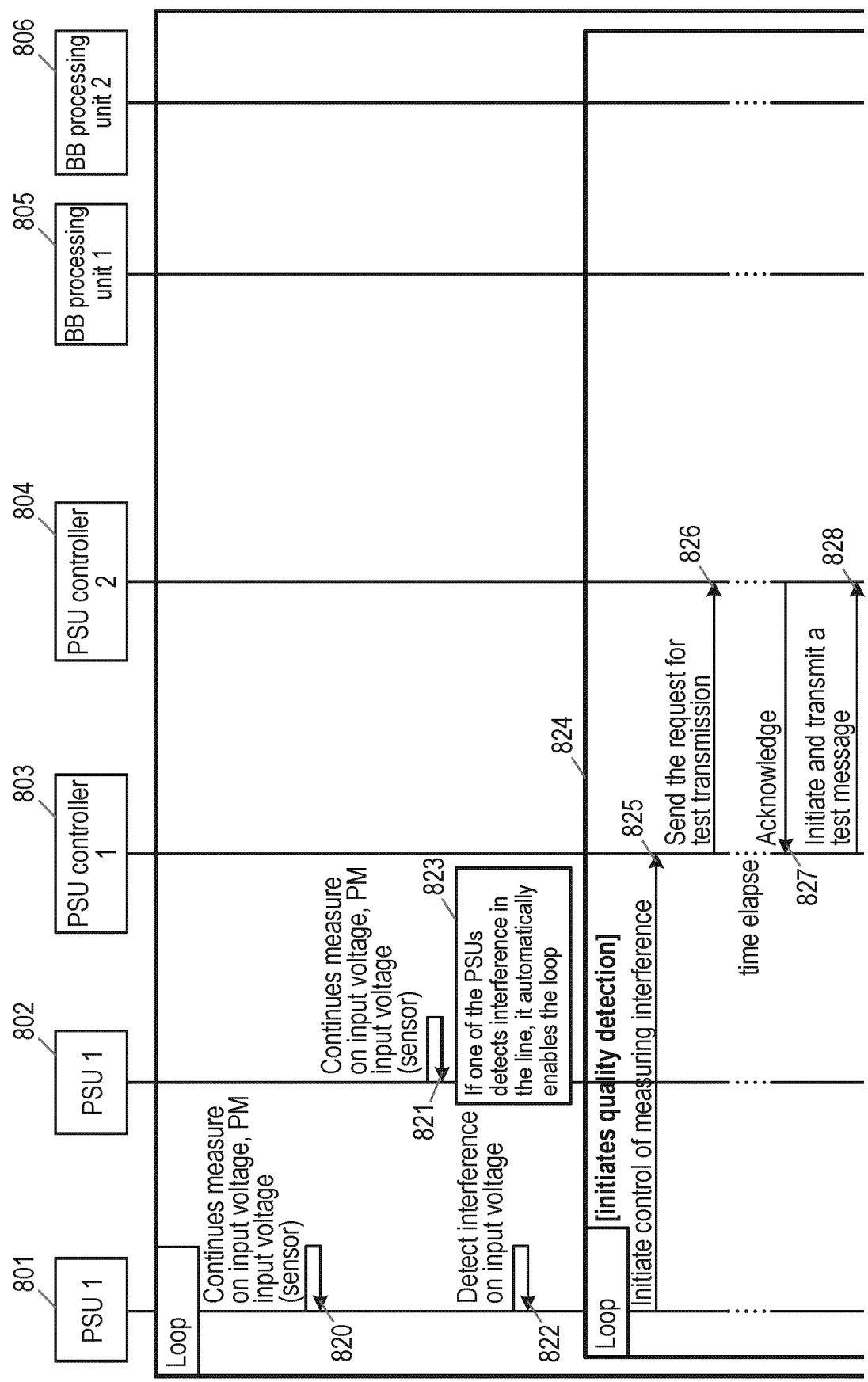
FIG. 8 is a PLC testing procedure that can be performed in various embodiments.
Figure 8B:
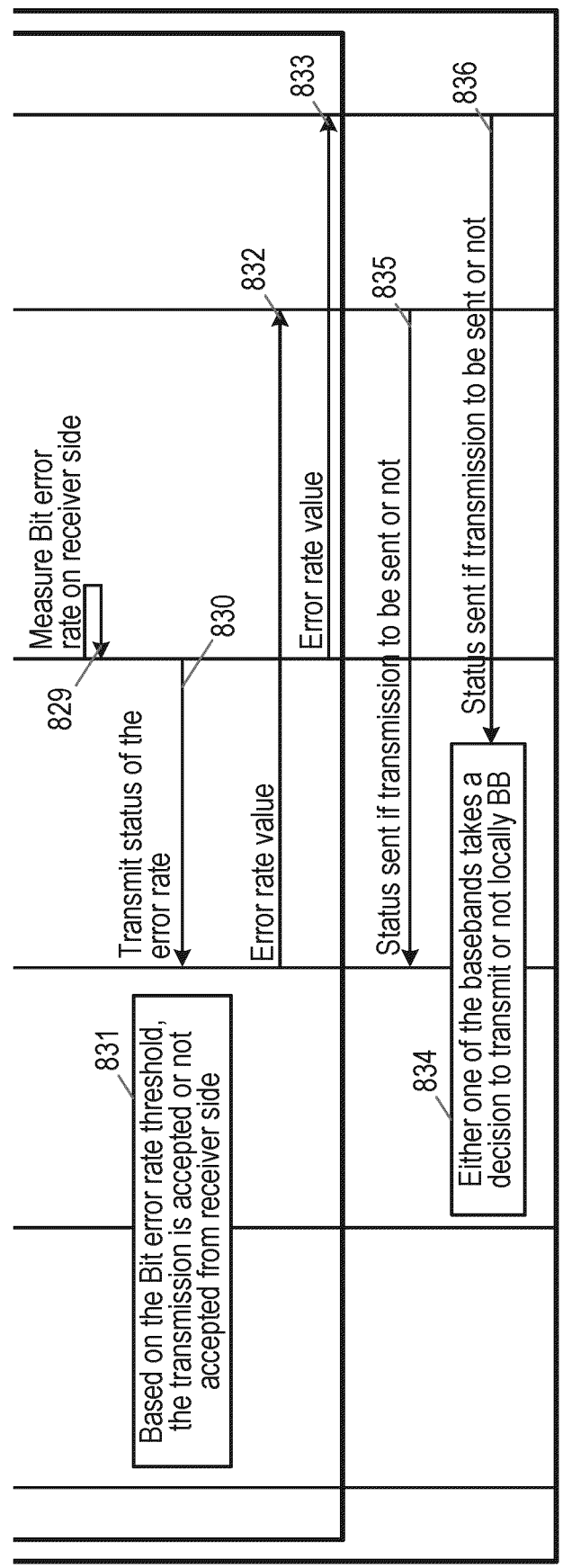

The signalling diagram in FIG. 8 illustrates a PLC testing procedure that can be performed in various embodiments of the present disclosure. FIG. 8 shows the signalling between a first PSU 801 (PSU 1) for a first RAN node that is operated by a first network operator, a second PSU 802 (PSU 2) for a second RAN node that is operated by a second network operator, a first PSU controller 803 (PSU controller 1) in the first PSU 801, a second PSU controller 804 (PSU controller 2) in the second PSU 802, a first BB processing unit 804 (BB processing unit 1) in the first RAN node and a second BB processing unit 806 (BB processing unit 2) in the second RAN node. Each of the first PSU 801, second PSU 802, first PSU controller 803, second PSU controller 804, first BB processing unit 804 and second BB processing unit 806 can be configured as described above with reference to the corresponding components shown in FIG. 4.

The process shown in FIG. 8 is performed on a loop (i.e. it repeats). Initially, each of the first PSU 801 and the second PSU 802 measure the input voltage received from the electrical power supply. This is shown by steps 820 and 821 respectively.

The PSUs 801, 802 evaluate the measured input voltages to determine if there is interference in the power supply. If, or when, one (or both) of the PSUs 801, 802 detects interference in the power supply, for example if the interference is above a threshold amount, the PSU 801, 802 initiates a quality detection process 824. In the following it is assumed that the first PSU 801 detects the interference and initiates the quality detection process 824.

The quality detection process 824 is initiated by the first PSU 801 sending an initiation message 825 to the first PSU controller 803. After receiving the initiation message 825, the first PSU controller 803 sends a request 826 for a test transmission to the second PSU controller 804. The second PSU controller 804 acknowledges the request with acknowledgement 827, and the first PSU controller 803 initiates and transmits a test message 828 to the second PSU controller 804 (e.g. a message according to the ICMP). In step 829 the second PSU controller 804 measures a quality parameter (e.g. BER) of the test message and transmits an indication 830 of the measured quality parameter to the first PSU controller 803. The indication 830 may be the measured value of the quality parameter itself. In step 831 the first PSU controller 803 and the second PSU controller 804 determine if the quality of the PLC link is acceptable based on the indication 830. In some embodiments, step 831 can comprise comparing a received BER measurement to a BER threshold to determine if the quality of the PLC is acceptable. The first PSU controller 803 and the second PSU controller 804 then each report the indication 830, the measured value of the quality parameter and/or the result of step 831 to their respective BB processing unit 805, 806 via respective signals 832 and 833. This concludes the quality detection process 824, and this process can be repeated periodically, continuously, and/or as required.

In step 834, each of the BB processing units 805, 806 determines whether a transmission can or is to be sent using the PLC link. This decision is based on the information received in signals 832, 833 respectively. Each of the BB processing units 805, 806 signals to the respective PSU controller 802, 803 a status indicating whether a transmission is to be sent using the PLC link. The status signals are labelled 835 and 836 respectively.

Figure 9:
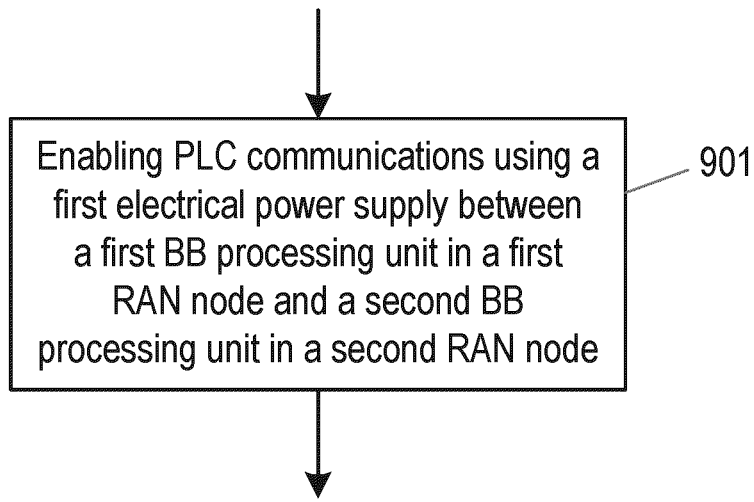
FIG. 9 is a flow chart representing a method of operating a PSU according to various embodiments.

The flow chart in FIG. 9 illustrates a method of operating a PSU 402a according to embodiments of the techniques described herein. The PSU 402a is in use in a first RAN node in a communication network. The PSU 402a comprises a power supply input interface 403a connected to an electrical power supply 400, and a PLC unit 412a connected to the power supply input interface 403a. In some embodiments, the PSU 402a further comprises an AC to DC converter configured to convert AC electrical power received by the power supply input interface 403a from the electrical power supply 400 to DC electrical power at an output interface 407a of the PSU 402a. In some embodiments, the PSU 402a further comprises a PSU controller 408a.

In a first step, step 901, the method comprises enabling communications according to a PLC protocol using the electrical power supply 400 between a first BB processing unit 410a in the first RAN node and a second BB processing unit 410b in a second RAN node that is also connected to the electrical power supply 400. In some embodiments, this step comprises operating according to the PLC protocol using AC electrical power.

In some embodiments, the first RAN node is operated by a first network operator and the second RAN node is operated by a second, different, network operator. In alternative embodiments, both RAN nodes are operated by the same network operator.

In some embodiments, the first RAN node and the second RAN node are located at a same site (i.e. same geographical location).

In some embodiments, the method further comprises the PSU controller 408a determining a reliability of the electrical power supply 400 for handling communications between the first BB processing unit 410a and the second BB processing unit 410b using PLC. In some embodiments, determining the reliability can comprise determining a number of packet drops and/or amount of retransmissions of a test message sent between the first BB processing unit 410a and the second BB processing unit 410b. In other embodiments, determining the reliability can comprise determining a Bit Error Rate for the PLC link. In some embodiments, the method can further comprise the PSU controller 408a determining whether to switch off the PSU 402a after information is sent to the second BB processing unit 410b using PLC based on the determined reliability of the electrical power supply 400.

The communications between the first BB processing unit 410a and the second BB processing unit 410b can comprise control plane signalling. In some embodiments, the communications between the first BB processing unit 410a and the second BB processing unit 410b relate to a handover of a first wireless device that is served by one of the first RAN node and the second RAN node to the other one of the first RAN node and the second RAN node. In these embodiments, the communications can be any one or more of a handover request, a handover request acknowledgement and a SN Status Transfer message. In some embodiments the handover request can comprise an IP address of a serving gateway of the first network operator.

Figure 10:
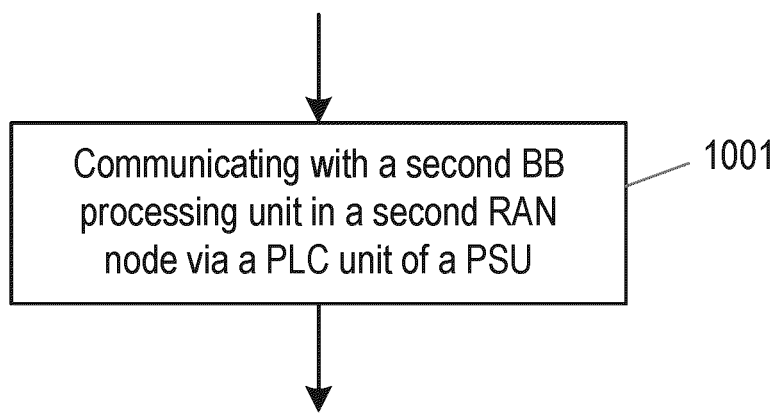
FIG. 10 is a flow chart representing a method of operating a first BB processing unit according to various embodiments.

The flow chart in FIG. 10 illustrates a method of operating a first BB processing unit 410a according to embodiments of the techniques described herein. The first BB processing unit 410a is in use in a first RAN node in a communication network. The first BB processing unit 410a is connected to a PLC unit 412a of a PSU 402a of the first RAN node. In some embodiments, the first BB processing unit 410a connects to the PSU 402a to receive electrical power. The PSU 402a is connected to an electrical power supply 400 and the PLC unit 412a is configured to operate according to a PLC protocol using the electrical power supply 400. In some embodiments, the PSU 402a further comprises an AC to DC converter configured to convert AC electrical power received by the power supply input interface 403a from the electrical power supply 400 to DC electrical power at an output interface 407a of the PSU 402a. In some embodiments, the PSU 402a further comprises a PSU controller 408a.

In a first step, step 1001, the method comprises communicating with a second BB processing unit 410b in a second RAN node via the PLC unit 412a of the PSU 402a.

In some embodiments, the first RAN node is operated by a first network operator and the second RAN node is operated by a second, different, network operator. In alternative embodiments, both RAN nodes are operated by the same network operator.

In some embodiments, the first RAN node and the second RAN node are located at a same site (i.e. same geographical location).

The first RAN node and the second RAN node are preferably connected to a same electrical power supply.

In some embodiments, the method further comprises the first BB processing unit 410a receiving an indication from the PSU 402a as to a reliability of the electrical power supply 400 for handling communications between the first BB processing unit 410a and the second BB processing unit 410b using PLC. In some embodiments, the method can further comprise sending an indication to the PSU 402a indicating whether communications are to be sent to and/or received from the second BB processing unit 410b using PLC. The indication sent to the PSU 402a is based on the received indication of the reliability of the electrical power supply 400.

In some embodiments, the communications between the first BB processing unit 410a and the second BB processing unit 410b comprise control plane signalling. In some embodiments, the communications between the first BB processing unit 410a and the second BB processing unit 410*b* relate to a handover of a first wireless device that is served by one of the first RAN node and the second RAN node to the other one of the first RAN node and the second RAN node. In these embodiments, the communications can be any one or more of a handover request, a handover request acknowledgement and a SN Status Transfer message. In some embodiments the handover request can comprise an IP address of a serving gateway of the first network operator.

In some embodiments, the method can further comprise monitoring a load in a first cell operated by the first RAN node, and determining whether a handover of one or more wireless devices served by the first cell is required based on the load in the first cell. If it is determined that a handover of one or more wireless devices is required, then the method can further comprise sending a handover request to the second RAN node via the PSU 402*a*. In some embodiments, the method further comprises identifying one or more wireless devices served by the first cell that are to be handed over to the second RAN node if it is determined that a handover of one or more wireless devices is required.

Thus, the present disclosure enables signalling to be sent between BB processing units located at the same radio site (particularly those managed by different network operators) using PLC. The PLC link can be used to efficiently send, receive or exchange control plane signalling, including signalling relating to a handover of one or more wireless devices from one RAN node to another.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the scope of the disclosure. Various exemplary embodiments can be used together with one another, as well as interchangeably therewith, as should be understood by those having ordinary skill in the art.

The invention claimed is:

1. A power supply unit, PSU, configured for use in a first radio access network, RAN, node in a communication network, the PSU comprising:
   a power supply input interface configured to enable the PSU to be connected to, and receive electrical power from, an electrical power supply; and
   a power line communication, PLC, unit connected to the power supply input interface and configured to connect to a first baseband, BB, processing unit in the first RAN node, wherein the first BB processing unit is configured for processing baseband signals in the first RAN node, and wherein the PLC unit is configured to operate according to a PLC protocol to enable communications between the first BB processing unit and a second BB processing unit in a second RAN node that is also connected to the electrical power supply;
   wherein the communications between the first BB processing unit in the first RAN node and the second BB processing unit in the second RAN node comprise control plane signaling.

2. A PSU as claimed in claim 1, wherein the first RAN node is operated by a first network operator and the second RAN node is operated by a second, different, network operator.

3. A PSU as claimed in claim 1, wherein the first RAN node and the second RAN node are located at a same site.

4. A PSU as claimed in claim 1, wherein the PSU further comprises an alternating current, AC, to direct current, DC converter configured to convert AC electrical power received by the power supply input interface from the electrical power supply to DC electrical power at an output interface of the PSU.

5. A PSU as claimed in claim 1, wherein the PLC unit is configured to operate according to a PLC protocol using AC electrical power.

6. A PSU as claimed in claim 1, wherein the PSU further comprises a PSU controller that is configured to determine a reliability of the electrical power supply for handling communications between the first BB processing unit and the second BB processing unit using PLC.

7. A PSU as claimed in claim 6, wherein the PSU controller is further configured to:
   determine whether to switch off the PSU after information is sent to the second BB processing unit using PLC based on the determined reliability of the electrical power supply.

8. A PSU as claimed in claim 1, wherein the communications between the first BB processing unit in the first RAN node and the second BB processing unit in the second RAN node relate to a handover of a first wireless device that is served by one of the first RAN node and the second RAN node to the other one of the first RAN node and the second RAN node.

9. A PSU as claimed in claim 8, wherein the PLC unit is configured to relay any one or more of a handover request, a handover request acknowledgement and a SN Status Transfer message between the first BB processing unit and the second BB processing unit using PLC over the electrical power supply.

10. A PSU as claimed in claim 9, wherein the handover request comprises an Internet Protocol, IP, address of a serving gateway of the first network operator.

11. A first baseband, BB, processing unit, configured for processing baseband signals in a first radio access network, RAN, node in a communication network, wherein the first BB processing unit is configured to connect to a power line communication, PLC, unit of a power supply unit, PSU, of the first RAN node, wherein the PSU is configured to connect to an electrical power supply and the PLC unit of the PSU is configured to operate according to a PLC protocol using the electrical power supply, and wherein the first BB processing unit is configured to communicate with a second BB processing unit in a second RAN node via the PSU, wherein the communications between the first BB processing unit in the first RAN node and the second BB processing unit in the second RAN node comprise control plane signaling.

12. A first BB processing unit as claimed in claim 11, wherein the first RAN node and the second RAN node are connected to a same electrical power supply.

13. A first BB processing unit as claimed in claim 11, wherein the first BB processing unit is further configured to connect to the PSU to receive electrical power.

14. A first BB processing unit as claimed in claim 11, wherein the first BB processing unit is further configured to send an indication to the PSU indicating whether communications are to be sent to and/or received from the second BB processing unit using PLC based on the received indication of the reliability of the electrical power supply.

15. A first BB processing unit as claimed in claim 11, wherein the first BB processing unit is further configured to:
   monitor a load in a first cell operated by the first RAN node; and determine whether a handover of one or more wireless devices served by the first cell is required based on the load in the first cell.

16. A first BB processing unit as claimed in claim 15, wherein the first BB processing unit is further configured to identify one or more wireless devices served by the first cell that are to be handed over to the second RAN node if the first BB processing unit determines that a handover of one or more wireless devices is required.

17. A first BB processing unit as claimed in claim 16, wherein the first BB processing unit is further configured to send a handover request to the second RAN node via the PSU if the first BB processing unit determines that a handover of one or more wireless devices is required.

18. A method of operating a power supply unit, PSU, in a first radio access network, RAN, node in a communication network, the PSU comprising a power supply input interface connected to an electrical power supply, and a power line communication, PLC, unit connected to the power supply input interface, wherein the method comprises:
    enabling communications according to a PLC protocol using the electrical power supply between a first baseband, BB, processing unit in the first RAN node that is for processing baseband signals in the first RAN node and a second BB processing unit in a second RAN node that is also connected to the electrical power supply, wherein the communications between the first BB processing unit in the first RAN node and the second BB processing unit in the second RAN node comprise control plane signaling.

19. A method of operating a first baseband, BB, processing unit in a first radio access network, RAN, node in a communication network, wherein the first BB processing unit is connected to a power line communication, PLC, unit of a power supply unit, PSU, of the first RAN node, wherein the PSU is connected to an electrical power supply and the PLC unit of the PSU is configured to operate according to a PLC protocol using the electrical power supply, wherein the method comprises:
    communicating with a second BB processing unit in a second RAN node via the PLC unit of the PSU, wherein the communications between the first BB processing unit in the first RAN node and the second BB processing unit in the second RAN node comprise control plane signaling.

* * * * *